(12) United States Patent
Aiki et al.

(10) Patent No.: US 6,458,034 B1
(45) Date of Patent: Oct. 1, 2002

(54) GAME SYSTEM AND COMPUTER-USABLE INFORMATION

(75) Inventors: Shinichiro Aiki, Kawasaki (JP); Koji Kawashima, Kawasaki (JP)

(73) Assignee: Namco Ltd., Tokyo (JP)

(*) Notice: Subject to any disclaimer, the term of this patent is extended or adjusted under 35 U.S.C. 154(b) by 0 days.

(21) Appl. No.: 09/830,078

(22) PCT Filed: Aug. 25, 2000

(86) PCT No.: PCT/JP00/05744

§ 371 (c)(1),
(2), (4) Date: May 15, 2001

(30) Foreign Application Priority Data

Aug. 27, 1999 (JP) .......................................... 11-240881

(51) Int. Cl.[7] .................................................. A63F 9/24
(52) U.S. Cl. ............................... 463/49; 463/2; 463/34; 463/53
(58) Field of Search .............................. 463/49, 30, 31, 463/32, 33, 40, 50, 51, 52, 1, 2, 7, 34, 53, 54; 273/348, 358; 345/472

(56) References Cited

U.S. PATENT DOCUMENTS 5,213,335 A * 5/1993 Dote et al.
5,248,150 A * 9/1993 Koma
6,206,783 B1 * 3/2001 Yamamoto et al. ............ 463/36

FOREIGN PATENT DOCUMENTS

| JP | A 60-262185 | 12/1985 |
| JP | A 4-259482 | 9/1992 |
| JP | A 5-177059 | 7/1993 |
| JP | A 7-181934 | 7/1995 |
| JP | A 8-280937 | 10/1996 |
| JP | 10113431 A * | 5/1998 |
| JP | A 2000-176172 | 6/2000 |

OTHER PUBLICATIONS

The Amusement Industry, vol. 28 No. 3, p. 94, Feb. 26, 1999.

* cited by examiner

Primary Examiner—Chen-Wen Jiang
(74) Attorney, Agent, or Firm—Oliff & Berridge, PLC (57) ABSTRACT

To provide a game system which can lighten the burden imposed on a player and even the third person can enjoy, when a gun shooting game is played using a rifle equipped with a scope, a proximity sensor section (210) is provided on a gun device 200, for changing an image from a long-distance image to a short-distance image, using an image changing section (130) when it is judged that the player has come close to the proximity sensor section (210) and looks into the scope section (220), to thereby display the short-distance image on the display section (140).

16 Claims, 7 Drawing Sheets

GAME SYSTEM AND COMPUTER-USABLE INFORMATION

TECHNICAL FIELD

The present invention relates to a game system for playing a shooting game using a scope and computer-usable information.

BACKGROUND OF ART

In general, a game machine for playing a shooting game using a scope is so constituted that a player aims at a target included in a long-distance image displayed on a display using a scope and shoots the target.

With a conventional game machine, a display exclusive for a short-distance image is provided in a scope, and a short-distance image is displayed on the display by enlarging an aim position in a long-distance image.

In this case, since an enlarged image of a target is displayed in the scope, a player can enjoy the game while watching the enlarged image in the scope. However, since only a normal long-distance image is displayed on a display screen of the game machine, the game is not enjoyable for the third person who is watching the game. Moreover, since it is necessary to prepare two kinds of display screens, one for the normal display, and the other for a display for the enlarged image provided in the scope, the game machine has a complicated structure and becomes expensive.

Moreover, since two screens must be provided, the player has to move the visual point between the normal image and the enlarged image in the scope. Thus, the game is not only unexciting for the third person, but also is complicated for the player. In addition, since the focal movement of the player's eyes between the normal image and the enlarged image in the scope is large, it is not easy for the player to see the screen.

DISCLOSURE OF INVENTION

The present invention has been completed under this background, and the objective of the present invention relates to a game system and computer-usable information for enjoying a shooting game using a scope.

(1) To solve the above described problems, the game system according to the present invention is a game system in which a player shoots a target displayed on a screen while watching the target, the game system comprising:

a gun device having a scope section for aiming at the target;

indication means for performing selective indication to display on the screen a long-distance image or a short-distance image which is obtained by enlarging an aim position, which is determined by the scope section, in the long-distance image; and image generation means, based on the selective indication, for generating the long-distance image when it has been directed to display the long-distance image, and generating the short-distance image when it has been directed to display the short-distance image.

(2) Another game system according to the present invention is a game system in which a player shoots a target displayed on a screen while watching the target, the game system comprising:

a gun device having a scope section for aiming at the target;

an indication circuit for performing selective indication to display on the screen a long-distance image or a short-distance image which is obtained by enlarging an aim position, which is determined by the scope section, in the long-distance image; and an image generation circuit, based on the selective indication, for generating the long-distance image when it has been directed to display the long-distance image, and generating the short-distance image when it has been directed to display the short-distance image.

(3) Computer-usable information according to the present invention is computer-usable information embodied on an information storage medium or carrier wave, which stores information for a player to play a game in which the player shoots a target by using a gun device having a scope section for aiming at the target displayed on a screen, the information including information for realizing:

indication means for performing selective indication to display on the screen a long-distance image or a short-distance image which is obtained by enlarging an aim position, which is determined by the scope section, in the long-distance image; and image generation means, based on the selective indication, for generating the long-distance image when it has been directed to display the long-distance image, and generating the short-distance image when it has been directed to display the short-distance image.

A program of the present invention may include a module for realizing the above-described means.

According to the present invention, a player can see a short-distance image on the same screen as that of a long-distance image, hence movement of the visual point can be small, enabling to enjoy the game comfortably.

Moreover, a short-distance image obtained by enlarging an image of a portion in a long-distance image seen by a player via the scope section is displayed on the screen, thereby the third person who is watching the game image of a game played by the player can confirm a point which the player aims at, thus even the third person can enjoy the game.

(4) In the game system, the gun device may comprise detection means for detecting whether the player has come close to the scope section, and the indication means may perform the selective indication based on a signal from the detection means.

(5) In the game system, the gun device may comprise a sensor section for detecting whether the player has come close to the scope section, and the indication circuit may perform the selective indication based on a signal from the sensor section.

(6) In the computer-usable information, the indication means may perform the selective indication, based on a signal from detection means which is provided on the gun device and detects whether the player has come close to the scope section.

According thereto, for example, when the player has come close to the scope section, the image can be changed from the long-distance image to the short-distance image, and the image transition similar to the actual aiming action can be effected. Hence, the player can enjoy more realistic game.

(7) In the game system, the gun device may comprise:

direction determining means for determining the direction of the gun device; and means for detecting an aim position determined by the scope section, based on a signal from the direction determining means.

(8) In the game system, the gun device may comprise:
a direction determining circuit for determining the direction of the gun device; and
a circuit for detecting an aim position determined by the scope section, based on a signal from the direction determining circuit.

(9) The computer-usable information may comprise information for realizing means for detecting an aim position determined by the scope section, based on a signal from a direction determining means which is provided on the gun device and for determining a direction of the gun device.

According thereto, the aim position can be easily and accurately detected, and a point which the player aims at can be properly enlarged and displayed.

(10) The game system may comprise:
light-receiving means provided on the gun device, for receiving light of an image displayed on the screen in a direction correspondent with an aiming axis of the scope section; and
means for detecting an aim position determined by the scope section, based on scanning information of the screen and a light-receiving result.

(11) The game system may comprise:
a light-receiving circuit provided on the gun device, for receiving light of an image displayed on the screen in a direction correspondent with an aiming axis of the scope section; and
a circuit for detecting an aim position determined by the scope section, based on scanning information of the screen and a light-receiving result.

(12) The computer-usable information may comprise information for realizing: means for making a receiving means to receive a signal transmitted from a means for converting a result of received light of an image displayed on the screen into a predetermined signal, the light has been received in a direction correspondent with an aiming axis of the scope section; and-means for detecting an aim position determined by the scope section, based on the received signal.

According thereto, for example, even when the gun device is not fixed to a supporting portion, or when the gun device is away from the game machine having the image generation means, the aim position can be properly detected.

(13) The game system may comprise magnification setting means for setting display magnification of the short-distance image with respect to the long-distance image, and
the image generation means may generate an image in which the display magnification of the short-distance image has been modified based on the setting information from the magnification setting means.

(14) The game system may comprise a magnification setting circuit for setting display magnification of the short-distance image with respect to the long-distance image, and
the image generation circuit may generate an image in which the display magnification of the short-distance image has been modified based on the setting information from the magnification setting circuit.

(15) The Computer-usable information may comprise information for realizing magnification setting means, which is provided on the gun device, for setting display magnification of the short-distance image with respect to the long-distance image,
the image generation means may generate an image in which the display magnification of the short-distance image has been modified based on the setting information from the magnification setting means.

According thereto, for example, a short-distance image and a long-distance image can be displayed at a magnification set by a player using the magnification setting means. Since the player can enlarge or reduce an image by the magnification set by himself/herself, the player can play the game in a state easy to play the game.

(16) Further game system according to the present invention is a game system in which a player shoots a target displayed on a screen while watching the target, the game system comprising:
a gun device having a scope section for aiming at the target;
image generation means which generates image information so that a short-distance image is displayed on the screen when the player has come close to the scope section, and a long-distance image is displayed on the screen when the player has not come close to the scope section.

According to the present invention, a player can see a short-distance image on the same screen as that of a long-distance image, hence movement of the visual point can be small, enabling to enjoy the game comfortably.

Moreover, a short-distance image obtained by enlarging an image of a portion in a long-distance image seen by a player via the scope section is displayed on the screen, thereby the third person who is watching the game image of a game played by the player can confirm a point which the player aims at, thus even the third person can enjoy the game.

BEST MODE FOR CARRYING OUT THE INVENTION

Embodiments of the present invention will now be described herein, in a case where the present invention is applied to a game system for a shooting game using a gun device.

First Embodiment

Figure 1:
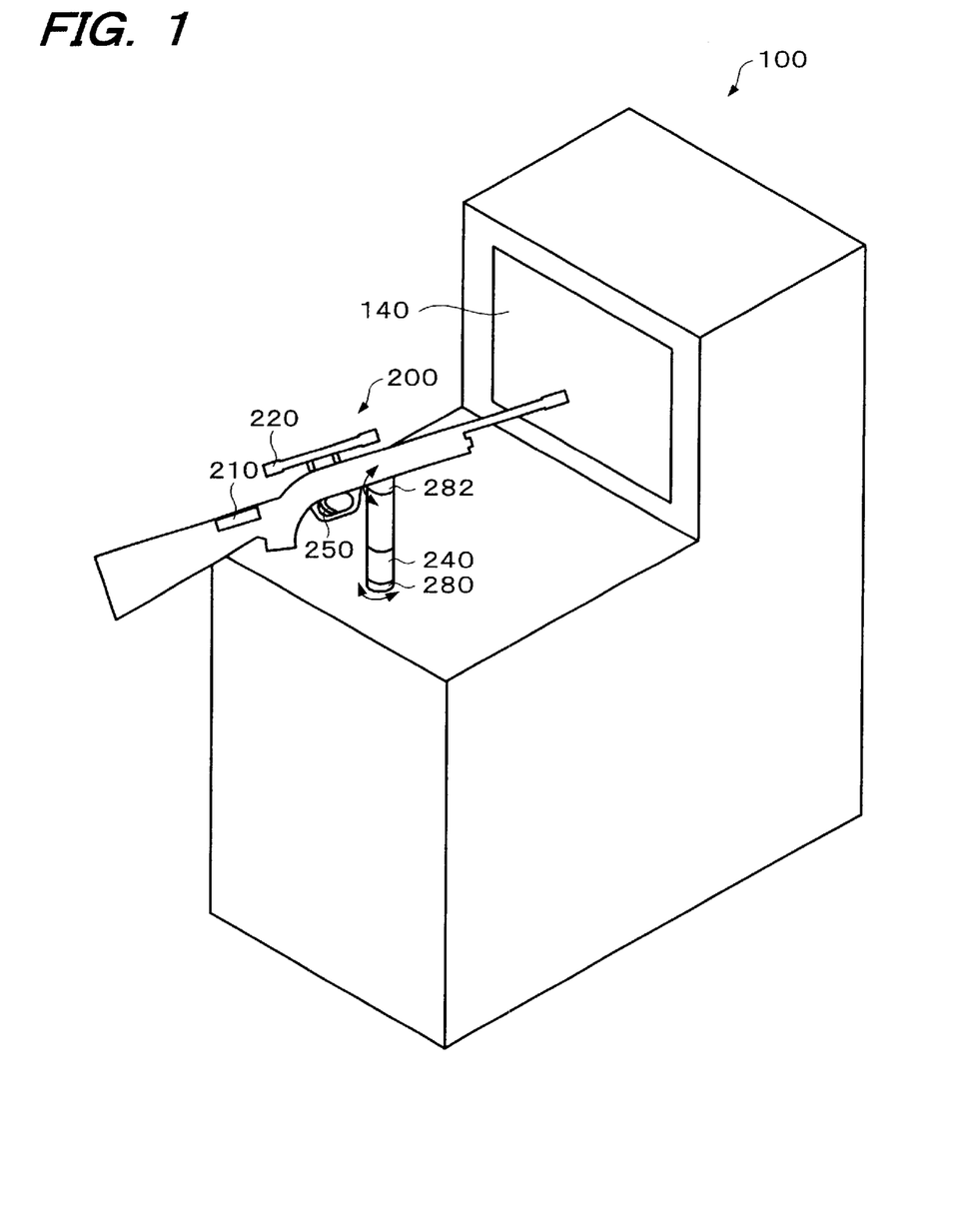
FIG. 1 is a perspective view of a game machine according to one embodiment of the invention.

FIG. 1 is a perspective view of the game machine 100 according to one embodiment of the invention.

The game machine 100 is a game machine for a gun shooting game including a rifle type gun device 200 in addition to a general device construction such as a display section 140 for displaying a game image and the like.

The gun device 200 comprises a cylindrical scope section 220 for aiming at a target displayed on the display section 140. A supporting portion 280 supports the scope section 220 rotatably in the horizontal direction of the game machine 100 body, and a supporting portion 282 supports the scope section 220 rotatably in the vertical direction of the game machine 100 body.

A player adjusts the angle in the vertical direction and the direction in the horizontal direction of the gun device 200 by looking into the scope section 220. And the player aims at a target displayed on the display section 140, and simulatingly fires a bullet, using a trigger section 250.

Next is a description of an aiming movement of a player.

Figure 2A:
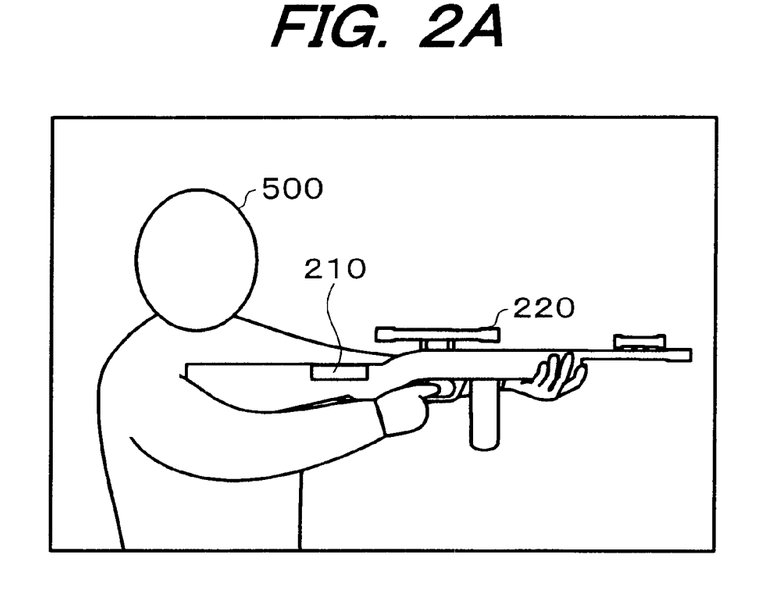
FIG. 2A shows one example of a state where the player does not look into the scope section and does not aim.
Figure 2B:
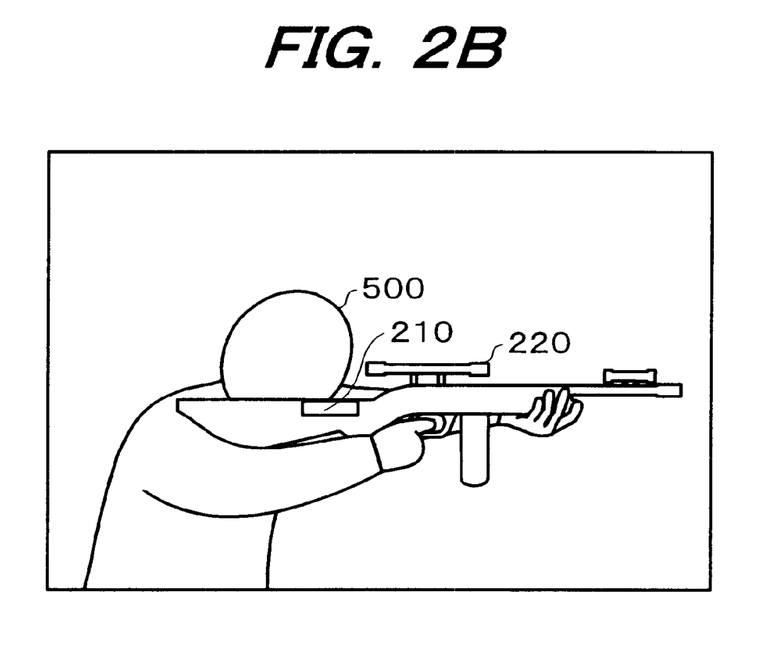
FIG. 2B shows one example of a state where the player looks into the scope section and aims.

FIG. 2A shows one example of a state where the player 500 does not look into the scope section 220 and does not aim, and FIG. 2B shows one example of a state where the player 500 looks into the scope section 220 and aims.

As shown in FIG. 1, a proximity sensor section 210 is provided on the upper part of the gunstock of the gun device 200.

As shown in FIG. 2A, when the player does not aim, the player 200 does not look into the scope section 220. Therefore, the player 500 does not come close to the proximity sensor section 210 provided in the vicinity of the scope section 220.

On the other hand, as shown in FIG. 2B, when the player aims, the player 200 looks into the scope section 220. Therefore, the player 500 comes close to the proximity sensor section 210.

As described above, by providing the proximity sensor section 210 on the upper part of the gunstock of the gun device in the vicinity of the scope section 220, it can be easily judged if the player 500 aims or not.

In this embodiment, the game machine 100 is constructed such that a long-distance image is displayed on the display section 140 when the player does not aim, and a short-distance image obtained by enlarging an aim position of a portion which the player 500 aims at is displayed on the display section 140 when the player aims.

Figure 3:
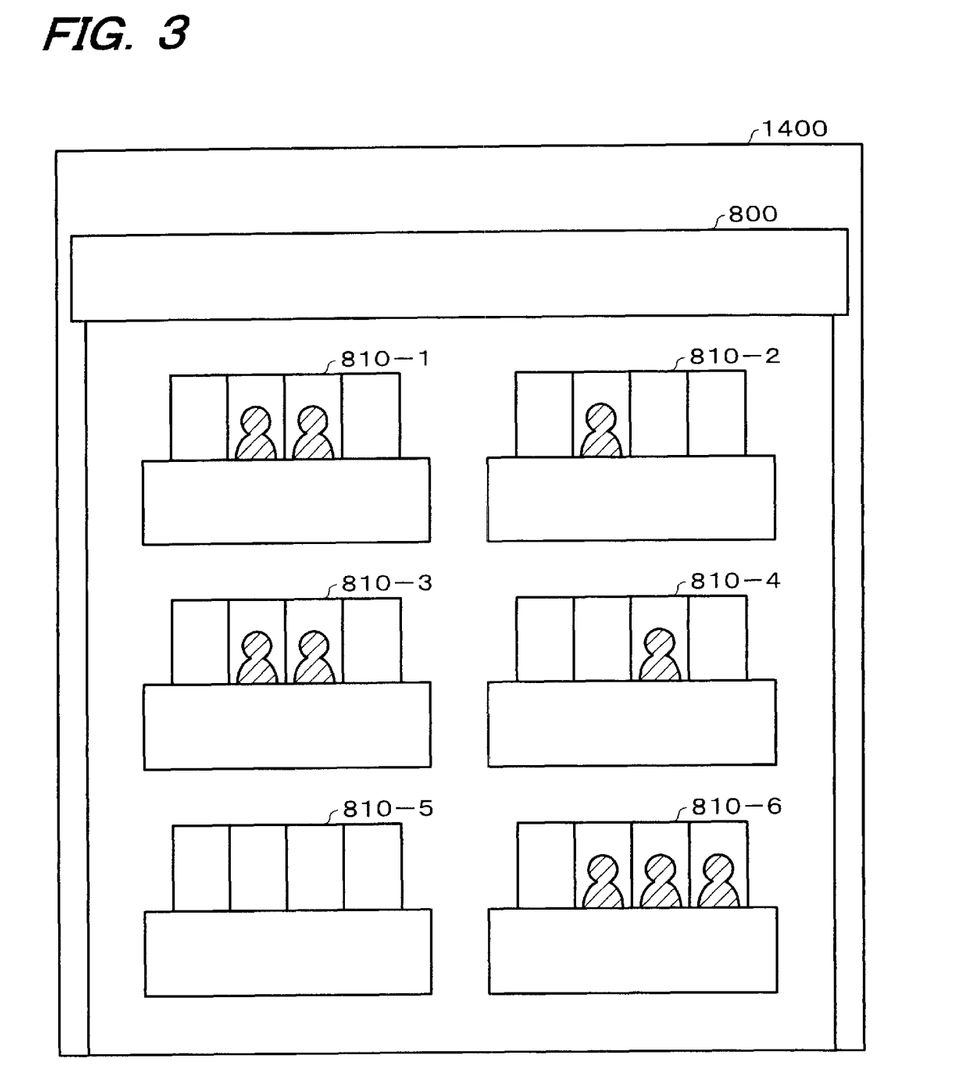
FIG. 3 is a view showing one example of a long-distance image in this embodiment.
Figure 4:
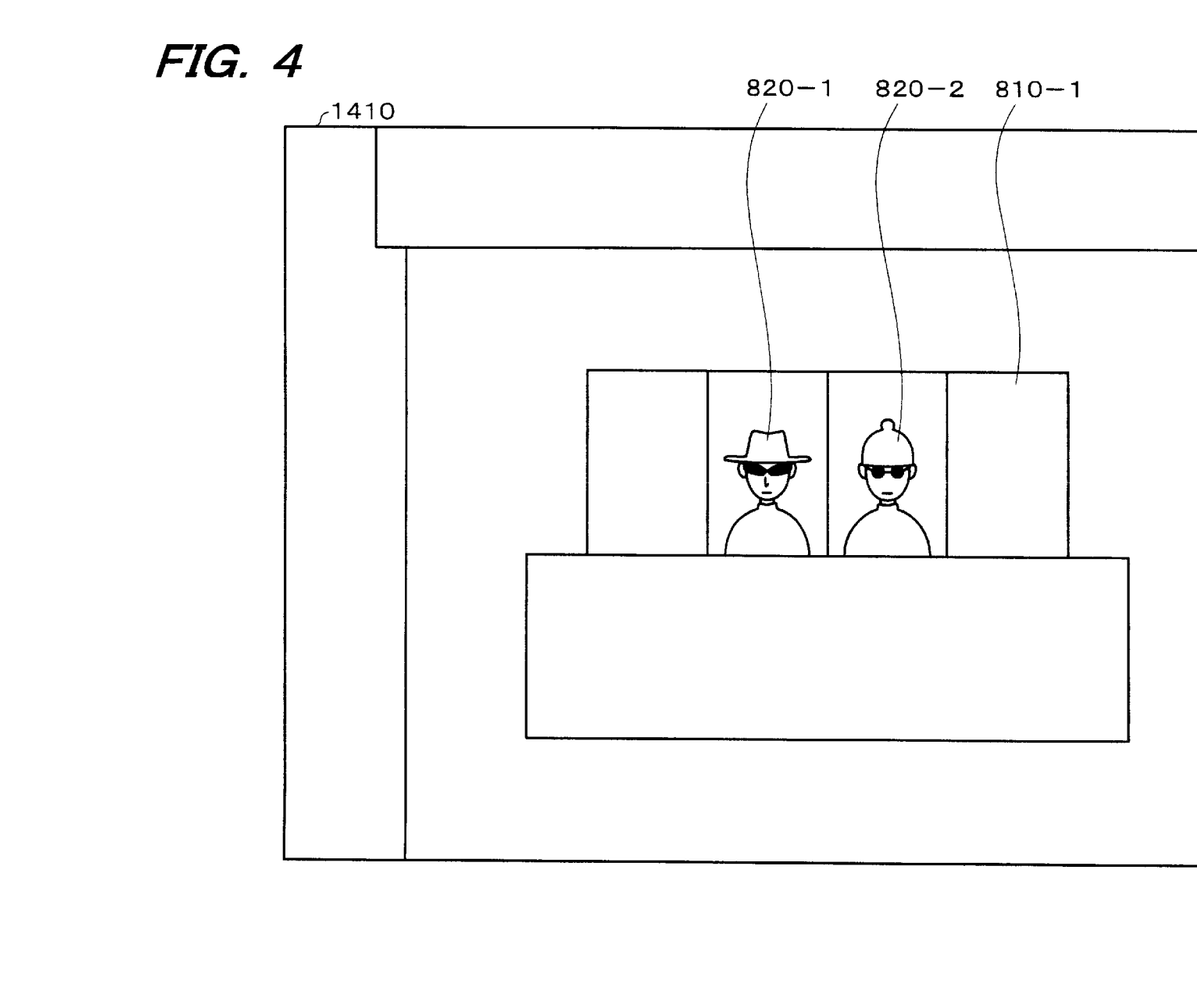
FIG. 4 is a view showing one example of a short-distance image in this embodiment.
Figure 5:
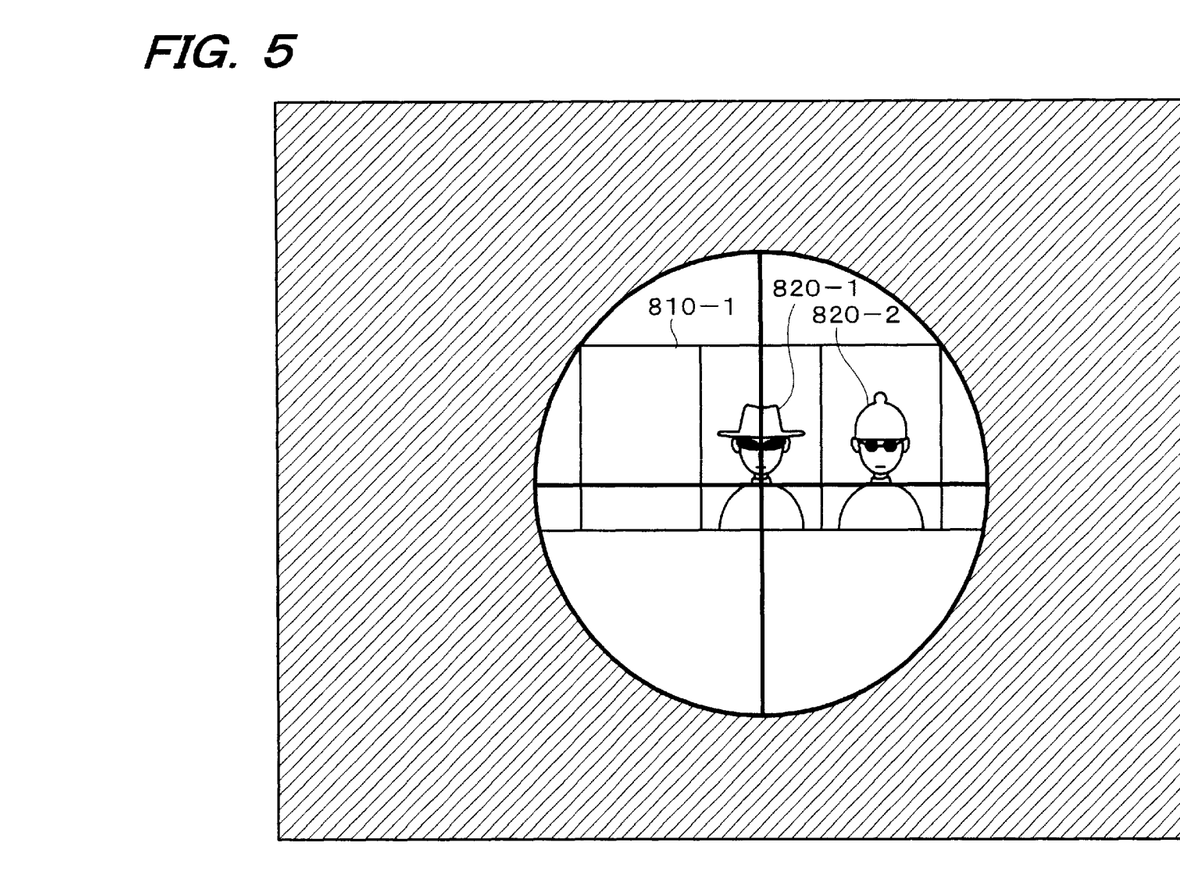
FIG. 5 is a diagram showing a case when the player looks into the scope section to watch the display section.

FIG. 3 is a view showing one example of a long-distance image 1400 in this embodiment. FIG. 4 is a view showing one example of a short-distance image 1410 in this embodiment. Moreover, FIG. 5 is a diagram showing a case when the player 500 looks into the scope section 220 to watch the display section 140.

In the long-distance image 1400 displayed on the display section 140, six rooms 810-1 to 810-6 are arranged in a building 800, and in each room 810, a figure can be seen.

The player 500 aims at a gang serving as an enemy as a target among these figures, but the third person cannot see which gang the player 500 aims.

As shown in FIG. 2B, the player 500 aims, and the short-distance image 1410 is displayed on the display section 140. More specifically, as shown in FIG. 4, an aim position which is a portion in the long-distance image 1400 which the player 500 aims at is enlarged and displayed as the short-distance image 1410.

Here, it is assumed that a gang 820-1 which is a target of the player 500 is in the aim position. In this case, a room 810-1 in the left upper portion in the building 800 is enlarged and displayed, then figures are displayed as the gang 820-1 and 820-2.

As described above, by displaying the short-distance image 1410 on the display section 140, not only the player 500 but also the third person who is watching the display section 140 can confirm where the player 500 aims, thus the third person can also enjoy the game together with the player 500.

The scope section 220 has a simple structure having a crisscross sight, without a screen display section and a lens. Hence, it is not required to provide a screen display section for short-distance images in the scope, as in the conventional case, enabling to make the device construction of the whole game system simple, and also to reduce the manufacturing cost.

Such a configuration makes it possible that the player 500 is to see the short-distance image 1410 displayed on the display section 140, as shown in FIG. 5.

The player 500 always watches the display section 140, and can confirm the short-distance image 1410 without watching a screen in the scope, as in the conventional case. Hence, the player 500 does not have to move the visual point between a near screen in the scope and a screen on the game machine away from it, enabling reduction of focus adjustment. Hence, the player 500 does not get tired so quickly, and can enjoy the game comfortably.

Moreover, by using the proximity sensor section 210, when the player 500 comes into a predetermined distance range from the scope section 220, an image can be changed over from the long-distance image 1400 to the short-distance image 1410. Therefore, the image transition similar to the actual aiming action can be carried out. Hence, the player 500 can enjoy the more realistic game.

Next is a description of a functional block of the game machine 100.

Figure 6:
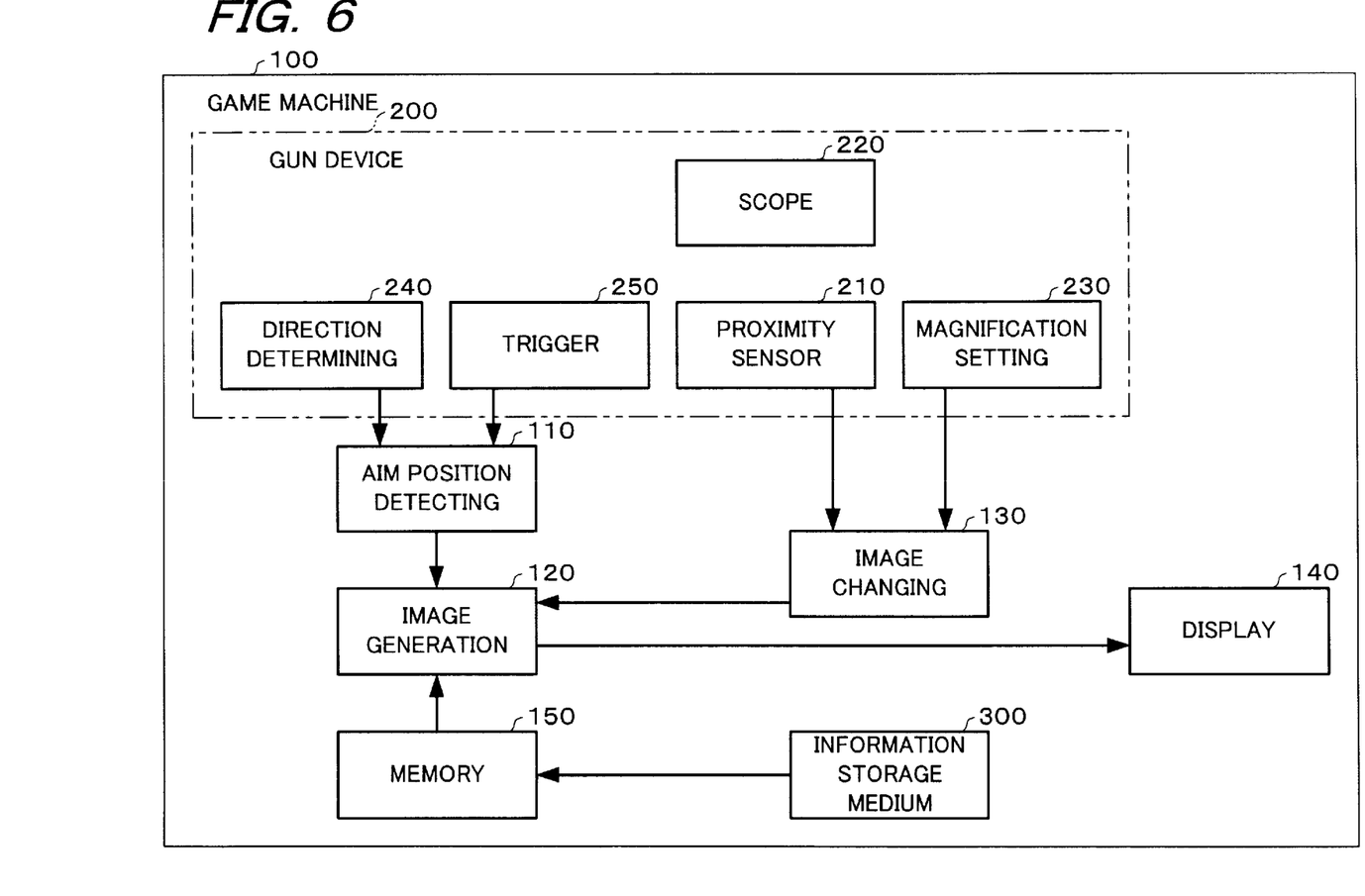
FIG. 6 is a functional block diagram of a game machine according to this embodiment.

FIG. 6 shows a functional block of the game machine 100 according to this embodiment.

The game machine 100 comprises a gun device 200.

The gun device 200 comprises a proximity sensor section 210 for detecting whether or not the player 500 comes into a predetermined distance range from the scope section 220; a scope section 220; a direction determining section 240 to which directional information (such as count value) in the horizontal direction is input from the supporting portion 280 and directional information in the vertical direction is input from the supporting portion 282; and a trigger section 250.

On the other hand, the game machine 100 body portion comprises an aim position detecting section 110 for detecting an aim position based on a signal from the direction determining section 240 and the trigger section 250; an image generation section 120 for generating a game image; an image changing section 130 serving as a indication means for performing selective indication with regard to images to the image generation section 120 to change over a long-distance image 1400 and a short-distance image 1410, based on a signal from the proximity sensor section 210.

Moreover, the game machine 100 comprises a memory section 150 for storing various information (programs, data), and a display section 140 for displaying the image generated in the image generation section 120.

Furthermore, the game machine 100 is constructed so as to be able to read the information in the information storage medium 300, and in the information storage medium 300, a predetermined storage information (programs, module) is stored.

The information storage medium 300 is connected to the game machine 100, thereby the storage information is read in the memory section 150, and the image generation section 120 and the like can perform its function by reading the storage information in the memory section 150.

For example, the storage information can be information for a player to play a shooting game using a gun device having a scope section for aiming at a target displayed on a screen, and includes information for realizing: the image changing section 130 serving as the indication means for selectively giving an indication to display on the screen a long-distance image or a short-distance image which is obtained by enlarging an aim position which is a portion of the long-distance image; and the image generation section 120, based on the selective indication, for generating the long-distance image when it has been directed to display the long-distance image, and generating the short-distance image when it has been directed to display the short-distance image.

By reading this storage information, the game machine 100 can realize various functions described above. In addition, in the storage information, the information for realizing the function of the aim position detecting section 110 and the like may also be included.

Moreover, the information stored in the information storage medium 300 may be the one embodied in the carrier. That is to say, the game machine 100 can perform various functions described above by reading information from a predetermined host terminal or the like, for example, via a network, not from the information storage medium 300. It is a matter of course that a hardware for storing the above described various information in the memory section 150 or the like, and performing detection of the aim position or the like may be applied.

As the hardware for realizing the above described functions, the ones described below may be applied.

AS the proximity sensor section 210, for example, not only non-contact type sensors using such as light, sound wave, electricity and magnetism but also a sensor of a mechanical contact type may be used. Moreover, as the scope section 220, for example, the one of a resin material in a cylindrical shape may be used. As the trigger section 250, for example, a normal trigger may be used. And, as the direction determining section 240, for example, IC or the like may be used. Furthermore, as the direction determining section 240, for example, a gyro, a geomagnetic sensor or the like may be used, when it is configured to obtain the directional information by itself.

Moreover, as the aim position detecting section 110 and the image changing section 130, for example, CPU may be used, and as the image generation section 120, for example, an image generating IC may be used, and as the memory section 150, for example, ROM, RAM and the like may be used. Furthermore, as the display section 140, for example, a display device such as CRT and the like may be used.

Furthermore, as the information storage medium 300, for example, storage medium using laser and magnetism, such as CD-ROM, DVD-ROM and IC card may be used.

The function of the aim position detecting section 110 can be realized in software manner by using a program or the like, or in hardware manner by using a circuit.

In addition, it is also possible to display an image at a magnification between the long-distance image and the short-distance image, not only two kinds of images of the long-distance image 1400 and the short-distance image 1410. In this case, for example, a dial-type magnification setting section 230 may be provided in the scope section 220 of the gun device 200, and the player 500 can change the display magnification of the short-distance image with respect to the long-distance image, by rotating the dial of the magnification setting section 230. The setting information from the magnification setting section 230 is input to the image changing section 130, and transmitted to the image generation section 120, hence an image of the display magnification is generated and displayed on the display section 140.

According thereto, since the player can enlarge or reduce the image at a magnification set by himself/herself, the player can enjoy the game in a state easy for the player to play the game.

The above described embodiment is for applying the present invention to a gun shooting game in the game machine 100 for commercial use, but it is also possible to apply the present invention to a household game machine.

Next is a description of an example where the present invention is applied to a household game machine.

Second Embodiment

Figure 7:
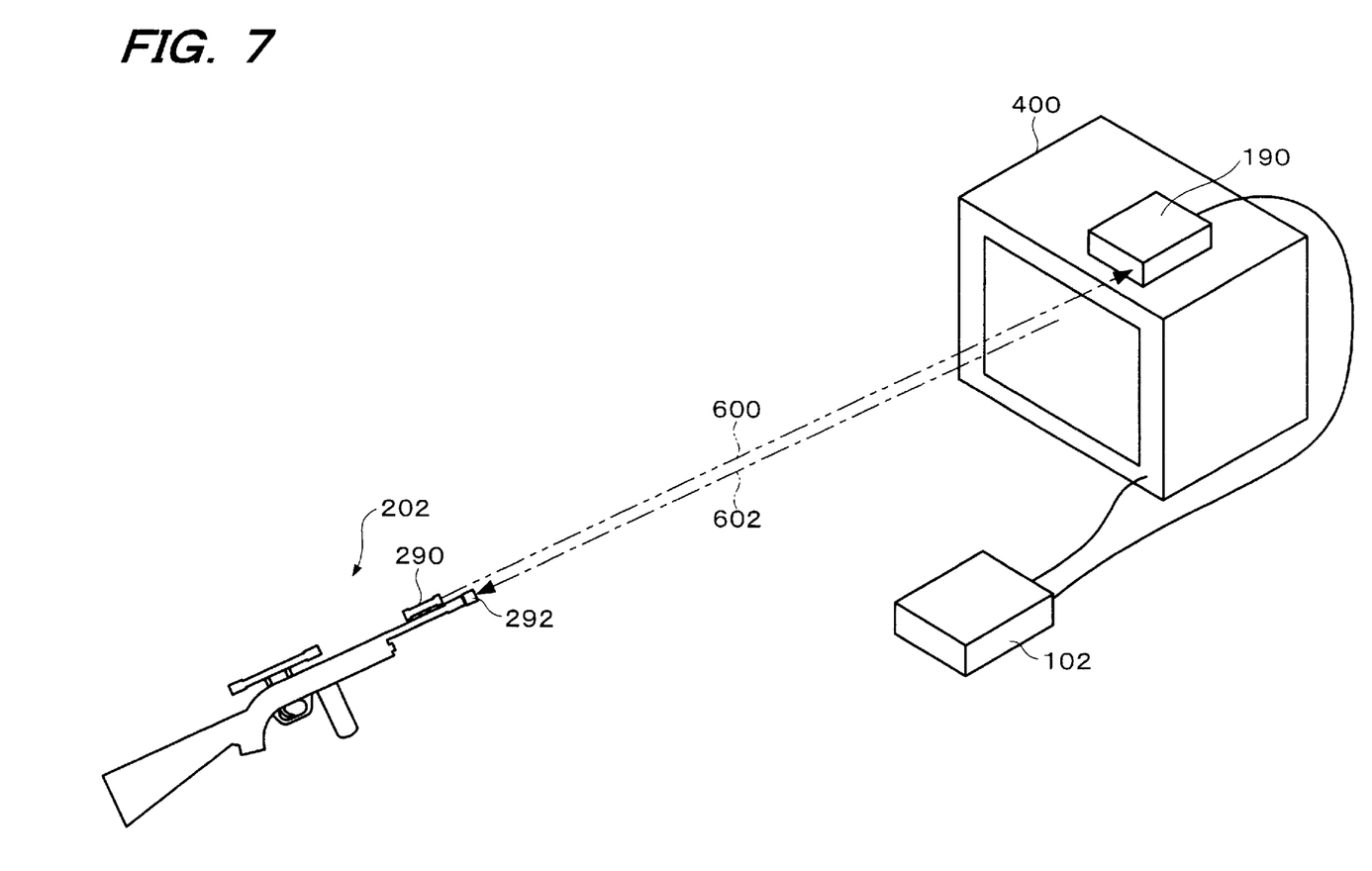
FIG. 7 is a perspective view of a game machine according to another embodiment of the invention.

FIG. 7 is a perspective view of a game machine 102 according to another embodiment of the invention.

The gun device 202 has a substantially similar construction as that of the gun device 200, but is not fixed by the supporting portions 280 and 282. Instead, the gun device 202 comprises a light receiving section 292 for receiving light 602 of an image from a TV device 400, and a transmission section 290 for converting the light-receiving result into an infrared signal and transmitting the signal to the reception section 190.

Here, the reception section 190 is connected to the game machine 102 and disposed on the upper portion of the TV device 400 which displays a game image.

A signal 600 is transmitted from the transmission section 290 and received by the reception section 190. The signal 600 received by the reception section 190 is transmitted to an aim position detecting section 110 in the game machine 102. The aim position detecting section 110 detects the aim position determined by the scope section 220, based on the signal 600.

According thereto, by transmitting and receiving the signal 600, the aim position can be detected. Thereby, even when the gun device 202 is not fixed by the supporting portions 280 and 282, and when the gun device 202 is away from the game machine 102 having the image generation means, the aim position can be properly detected.

Here, as the signal 600, other than the infrared light, signals such as laser beam, radio wave or the like can be used. As the transmission section 290 and the reception section 190, normal transmission means and reception means corresponding to the types of these signals may be used.

When the gun device 202 is not fixed by the supporting portions 280 and 282, it is also possible to materialize the game machine 102 wherein the gun device 202 and the game machine 102 are connected with a cable, the light receiving result at the light receiving section 292 is transmitted to the game machine 102 via the cable, and the a imposition of the gun device 202 is detected based on the scanning information on the screen of the TV device 400 and the light receiving result.

OTHER EMBODIMENTS

The embodiment of the present invention has been described above, but the application of the present invention is not limited to the above described embodiments.

For example, a switch may be provided instead of the proximity sensor section 210, and a player operates the switch to switch over a long-distance -image and a short-distance image to be displayed.

Moreover, the remote operation using the gun device 202 described in the second embodiment may be used not only to the household game machine 102 but also the commercial game machine.

Moreover, a description has been made to a case where the proximity sensor section 210 is provided on the upper part of the gunstock of the gun device 200 in the vicinity of the end portion, but it is also possible to provide the proximity sensor section 210 on the player side of the scope section 220.

Also a description has been made to a case where the scope section 220 has a simple structure having a crisscross sight, without a screen display section and a lens, but a lens may be provided to the scope section 220 and the image may be enlarged and displayed at a predetermined magnification.

What is claimed is:

1. A game system in which a player shoots a target displayed on a screen while watching the target, the game system comprising:

a gun device having a scope section for aiming at said target;

indication means for performing selective indication to display on said screen a long-distance image or a short-distance image which is obtained by enlarging an aim position, which is determined by said scope section, in said long-distance image; and image generation means, based on said selective indication, for generating said long-distance image when it has been directed to display said long-distance image, and generating said short-distance image when it has been directed to display said short-distance image.

2. The game system according to claim 1, wherein said gun device comprises detection means for detecting whether said player has come close to said scope section, and wherein said indication means performs said selective indication based on a signal from said detection means.

3. The game system according to claim 2, wherein said gun device comprises:

direction determining means for determining the direction of said gun device; and means for detecting an aim position determined by said scope section, based on a signal from said direction determining means.

4. The game system according to claim 2, further comprising:

light-receiving means provided on said gun device, for receiving light of an image displayed on said screen in a direction correspondent with an aiming axis of said scope section; and means for detecting an aim position determined by said scope section, based on scanning information of said screen and a light-receiving result.

5. The game system according to claim 2, comprising magnification setting means for setting display magnification of said short-distance image with respect to said long-distance image, wherein said image generation means generates an image in which the display magnification of said short-distance image has been modified based on the setting information from said magnification setting means.

6. A game system in which a player shoots a target displayed on a screen while watching the target, the game system comprising:

a gun device having a scope section for aiming at said target;

an indication circuit for performing selective indication to display on said screen a long-distance image or a short-distance image which is obtained by enlarging an aim position, which is determined by said scope section, in said long-distance image; and an image generation circuit, based on said selective indication, for generating said long-distance image when it has been directed to display said long-distance image, and generating said short-distance image when it has been directed to display said short-distance image.

7. The game system according to claim 6, wherein said gun device comprises a sensor section for detecting whether said player has come close to said scope section, and wherein said indication circuit performs said selective indication based on a signal from said sensor section.

8. The game system according to claim 7, wherein said gun device comprises:

a direction determining circuit for determining the direction of said gun device; and a circuit for detecting an aim position determined by said scope section, based on a signal from said direction determining circuit.

9. The game system according to claim 7, further comprising:

a light-receiving circuit provided on said gun device, for receiving light of an image displayed on said screen in a direction correspondent with an aiming axis of said scope section; and a circuit for detecting an aim position determined by said scope section, based on scanning information of said screen and a light-receiving result.

10. The game system according to claim 7, comprising:

a magnification setting circuit for setting display magnification of said short-distance image with respect to said long-distance image, wherein said image generation circuit generates an image in which the display magnification of said short-distance image has been modified based on the setting information from said magnification setting circuit.

11. Computer-usable information embodied on an information storage medium or carrier wave, which stores information for a player to play a game in which the player shoots a target by using a gun device having a scope section for aiming at the target displayed on a screen, said information including information for realizing:

indication means for performing selective indication to display on said screen a long-distance image or a short-distance image which is obtained by enlarging an aim position, which is determined by said scope section, in said long-distance image; and image generation means, based on said selective indication, for generating said long-distance image when it has been directed to display said long-distance image, and generating said short-distance image when it has been directed to display said short-distance image.

12. The Computer-usable information according to claim 11, wherein said indication means performs said selective indication, based on a signal from detection means which is provided on said gun device and detects whether said player has come close to said scope section.

13. The Computer-usable information according to claim 12, comprising information for realizing means for detecting an aim position determined by said scope section, based on a signal from a direction determining means which is provided on said gun device and for determining a direction of said gun device.

14. The Computer-usable information according to claim 12, comprising information for realizing: means for making a receiving means to receive a signal transmitted from a means for converting a result of received light of an image displayed on said screen into a predetermined signal, said light has been received in a direction correspondent with an aiming axis of said scope section; and means for detecting an aim position determined by said scope section, based on the received signal.

15. The Computer-usable information according to claim 12, comprising information for realizing magnification setting means for setting display magnification of said short-distance image with respect to said long-distance image, wherein said image generation means generates an image in which the display magnification of said short-distance image has been modified based on the setting information from said magnification setting means.

16. A game system in which a player shoots a target displayed on a screen while watching the target, the game system comprising:

a gun device having a scope section for aiming at said target;

image generation means which generates image information so that a short-distance image is displayed on said screen when the player has come close to said scope section, and a long-distance image is displayed on said screen when the player has not come close to said scope section.

* * * * *